US012789844B2

(12) United States Patent
Kwon et al.

(10) Patent No.: US 12,789,844 B2
(45) Date of Patent: Nov. 10, 2026

(54) METHOD AND APPARATUS FOR DETERMINING JERK MINIMIZATION BEHAVIOR TO IMPROVE RIDE COMFORT IN AUTONOMOUS VEHICLES BASED ON DEEP REINFORCEMENT LEARNING

(71) Applicant: FOUNDATION OF SOONGSIL UNIVERSITY-INDUSTRY COOPERATION, Seoul (KR)

(72) Inventors: Min Hae Kwon, Seoul (KR); Jae Hwi Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 85 days.

(21) Appl. No.: 19/008,910

(22) Filed: Jan. 3, 2025

(65) Prior Publication Data

US 2026/0084717 A1 Mar. 26, 2026

(30) Foreign Application Priority Data

Sep. 25, 2024 (KR) ........................ 10-2024-0129935

(51) Int. Cl.
*B60W 60/00* (2020.01)
*B60W 30/18* (2012.01)
*B60W 50/00* (2006.01)

(52) U.S. Cl.
CPC .. *B60W 60/0013* (2020.02); *B60W 30/18163* (2013.01); *B60W 50/0098* (2013.01); *B60W 2520/105* (2013.01); *B60W 2720/106* (2013.01)

(58) Field of Classification Search
CPC ....... B60W 60/0013; B60W 30/18163; B60W 50/0098; B60W 2520/105; B60W 2720/106
See application file for complete search history.

(56) References Cited

U.S. PATENT DOCUMENTS

| | | | | |
|---|---|---|---|---|
| 2018/0345963 | A1* | 12/2018 | Maura | B60W 60/0011 |
| 2019/0113918 | A1* | 4/2019 | Englard | B60W 60/0015 |
| 2024/0320504 | A1* | 9/2024 | Iwaki | G06N 3/092 |
| 2025/0276718 | A1* | 9/2025 | Mahadevan | B60W 60/0011 |

FOREIGN PATENT DOCUMENTS

| | | | | | |
|---|---|---|---|---|---|
| CN | 118094947 | A | * | 5/2024 | G06F 17/16 |
| JP | 2020132143 | A | * | 8/2020 | G06V 20/588 |

* cited by examiner

*Primary Examiner* — Scott A Browne
*Assistant Examiner* — Terry C Buse
(74) *Attorney, Agent, or Firm* — Stein IP, LLC

(57) ABSTRACT

A vehicle behavior determination apparatus based on deep reinforcement learning for minimizing acceleration and deceleration comprises an information observation unit that collects observation information from a sensing module or a road side unit (RSU) of an autonomous vehicle; a policy execution unit that performs decision-making on an action including acceleration control and lane change of the autonomous vehicle based on the observation information and policy; a reward determination unit that determines a reward based on the observation information, the action, and the next time point observation information according to the action; and a policy learning unit that updates the policy based on the collected observation information.

16 Claims, 9 Drawing Sheets

METHOD AND APPARATUS FOR DETERMINING JERK MINIMIZATION BEHAVIOR TO IMPROVE RIDE COMFORT IN AUTONOMOUS VEHICLES BASED ON DEEP REINFORCEMENT LEARNING

CROSS-REFERENCE TO RELATED APPLICATIONS

This application claims the benefit of Korean Patent Application 10-2024-0129935 filed on Sep. 25, 2024, in the Korean Intellectual Property Office. All disclosures of the document named above are incorporated herein by reference.

TECHNICAL FIELD

The present invention relates to a method and apparatus for determining an action for minimizing jerk to improve the ride comfort of an autonomous vehicle based on deep reinforcement learning.

BACKGROUND ART

Recently, with the development of autonomous driving technology based on reinforcement learning, research on successful autonomous driving policies in various traffic environments has been conducted.

In order to commercialize autonomous driving technology, not only successful decision-making but also the comfort of the driver should be considered as important factors. However, autonomous driving research that proposes and compares models for improving comfort is rare.

DISCLOSURE

Technical Issues

In order to solve the problems of the above-mentioned prior art, the present invention proposes a method and apparatus for determining a jerk minimization action to improve the ride comfort of an autonomous vehicle based on deep reinforcement learning, which can minimize jerk that is a factor that reduces ride comfort in various road environments.

Technical Solution

In order to achieve the above object, according to one embodiment of the present invention, a vehicle behavior determination apparatus based on deep reinforcement learning for minimizing jerk comprises an information observation unit that collects observation information from a sensing module or a road-side unit (RSU) of an autonomous vehicle; a policy execution unit that performs decision-making on an action including acceleration control and lane change of the autonomous vehicle based on the observation information and policy; a reward determination unit that determines a reward based on the observation information, the action, and the next time point observation information according to the action; and a policy learning unit that updates the policy based on the collected observation information, the action, the next time point observation information, and the reward, and learns the policy by determining whether the number of learning times is met, wherein the reward in the reward determination unit is determined through a jerk reward term, a reward term for general driving of the autonomous vehicle, and a reward term for an accident.

The observation information may comprise at least one of absolute speed of the autonomous vehicle, relative speed between the closest leader vehicle in front and the closest follower vehicle in the rear among the vehicles in each lane observable by the autonomous vehicle, relative distance between the leader vehicle and the follower vehicle, density of vehicles by lane within a forward observation range of the autonomous vehicle, and presence or absence of a lane within the forward observation range of the autonomous vehicle.

The jerk reward term may be defined as a term that imposes a penalty for jerk due to rapid changes in acceleration/deceleration of the autonomous vehicle.

The jerk reward term $R_{t,jerk}$ may be defined by the following Equation, $$R_{t,jerk} = -\eta_{jerk}\left|\frac{a_{t,acc} - a_{t',acc}}{\Delta t}\right| \quad \text{[Equation]}$$

Here, $\eta_{jerk}$ is a coefficient for the jerk reward term, $a_{t,acc}$ is acceleration at time t, $a_{t',acc}$ is acceleration at time t', and $\Delta t = t - t'$ is a time step interval.

The coefficient is a coefficient set to reflect a driver's riding comfort driving characteristic, and may be determined based on user input through a user interface or data on a driver's driving characteristic.

The reward term for general driving may be configured by a linear combination of terms related to speed, lane change, safety distance, and delayed merge in a road merging environment.

The speed-related term may be defined as a term for learning an action in which an autonomous vehicle drives close to a target speed while not exceeding a speed limit.

The road merge-related term is defined as a penalty term for delayed merge of an autonomous vehicle, and the closer the autonomous vehicle merges to the lane transition point, the more it may be considered to be a delayed merge and a penalty may be imposed.

The road merge-related term may be defined by the following Equation $$R_{t,5} = \begin{cases} \zeta_{t+1,\hat{h}} - V, & \zeta_{t+1,\hat{h}} < V \\ 0, & \zeta_{t+1,\hat{h}} \geq V \end{cases} \quad \text{[Equation]}$$

Here, $\zeta_{t+1,\hat{h}}$ is the remaining driving distance from a lane where an autonomous vehicle is located to a lane transition point.

The apparatus according to the present embodiment further comprises, a data management unit that collects and processes data for offline reinforcement learning in advance; and an offline model learning unit that learns an offline policy network and an offline state-action value function network using a pre-collected dataset including observation information, an action, next time point observation information, a reward, and a cumulative reward collected by the data management unit, wherein the reward of the pre-collected dataset comprises a jerk reward term, a reward term for general driving of the autonomous vehicle, and a reward term related to an accident, wherein the policy learning unit may perform fine-tuning to update parameters of the offline policy network using an online dataset including the observation information, an action, next time point observation information, and a reward obtained through interaction with the offline policy network and environment, and the pre-collected dataset.

The policy learning unit may load the offline policy network, perform re-learning according to a preset reward function after initializing the state-action value function network, and perform fine-tuning after initializing the bias of the policy network.

The policy learning unit may obtain the observation information, an action, next time point observation information, and reward obtained through interaction with the environment, and update, according to the obtained reward, parameters of a pre-learned policy network and a re-initialized constructed state-action value function network according to the re-learning.

According to another aspect of the present invention, a vehicle behavior determination apparatus based on deep reinforcement learning for minimizing jerk comprises a processor; and a memory connected to the processor, wherein the memory comprises program instructions, executed by the processor, to perform operations performing collecting observation information from a sensing module or a road-side unit (RSU) of an autonomous vehicle, performing decision-making on an action including acceleration control and lane change of the autonomous vehicle based on the observation information and policy, determining a reward based on the observation information, the action, and the next time point observation information according to the action, and updating the policy based on the collected observation information, the action, the next time point observation information, and the reward, and learns the policy by determining whether the number of learning times is met, wherein the reward is determined through a jerk term, a reward term for general driving of the autonomous vehicle, and a reward term for an accident.

According to another aspect of the present invention, a method for determining a vehicle behavior that minimizes jerk based on deep reinforcement learning in an apparatus including a processor and memory comprises collecting observation information from a sensing module of an autonomous vehicle or a road-side unit (RSU); performing decision-making on an action including acceleration control and lane change of the autonomous vehicle based on the observation information and policy; determining a reward based on the observation information, the action, and the next time point observation information according to the action; and updating the policy based on the collected observation information, the action, the next time point observation information, and the reward, and learning the policy by determining whether the number of learning times is met, wherein the reward is determined through a jerk reward term, a reward term for general driving of the autonomous vehicle, and a reward term for an accident.

Advantageous Effects

According to the present invention, there is an advantage in that the vehicle information can be successfully detected and utilized by utilizing the sensing module mounted on the autonomous vehicle or the communication between the RSU-OBU, thereby minimizing jerk in various road environments.

In addition, according to the present invention, the autonomous vehicle can perform smooth and stable driving by minimizing rapid changes in speed, which improves the efficiency and stability of driving, and further improves the ride comfort of the autonomous vehicle in various road traffic environments.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
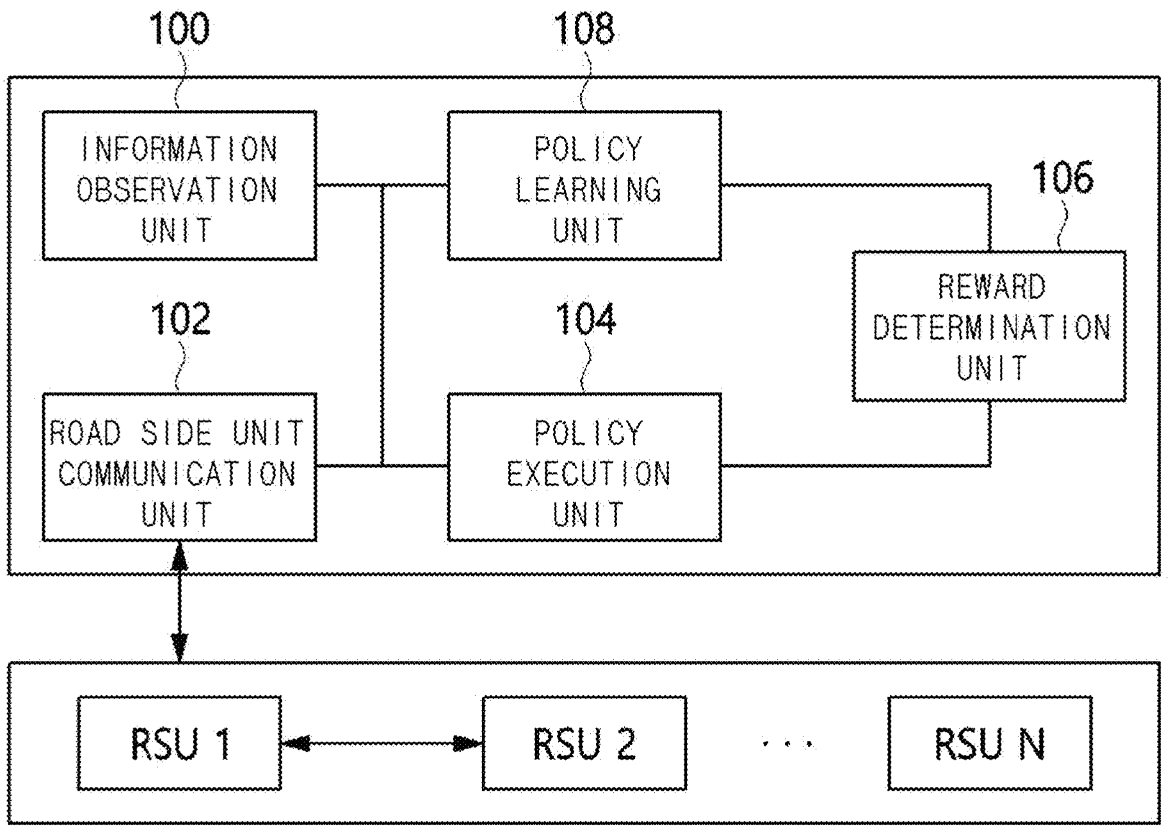
FIG. 1 is a diagram illustrating the configuration of a deep reinforcement learning-based jerk minimization behavior determination apparatus according to this embodiment.

The present invention can have various modifications and various embodiments, and specific embodiments are illustrated in the drawings and described in detail in the detailed description. However, this is not intended to limit the present invention to specific embodiments, and it should be understood that it includes all modifications, equivalents, and substitutes included in the spirit and technical scope of the present invention.

The terms used in this specification are used only to describe specific embodiments, and are not intended to limit the present invention. The singular expression includes the plural expression unless the context clearly indicates otherwise. In this specification, the terms "comprises" or "has" and the like are intended to specify the presence of a feature, number, step, operation, component, part, or combination thereof described in the specification, and should be understood not to exclude in advance the possibility of the presence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope that the technical idea of the present invention is maintained, and it is also obvious that multiple embodiments may be re-implemented as one embodiment integrated even if a separate description is omitted.

In addition, when describing with reference to the attached drawings, the same components are given the same or related reference numerals regardless of the drawing numerals, and redundant descriptions thereof are omitted. In describing the present invention, if it is determined that a specific description of a related known technology may unnecessarily obscure the gist of the present invention, a detailed description thereof is omitted.

This embodiment proposes a method for learning and performing a driving policy (hereinafter referred to as a policy) that can minimize jerk in various road environments.

Here, the policy can be defined as a policy model or policy network that performs decision-making (action decision) for driving an autonomous vehicle.

In this embodiment, the decision-making of the autonomous vehicle may be an action related to acceleration control and lane change in various road environments.

FIG. 1 is a diagram illustrating the configuration of an apparatus for determining a behavior for minimizing jerk based on deep reinforcement learning according to this embodiment.

As illustrated in FIG. 1, the apparatus according to this embodiment may comprise an information observation unit 100, a road-side unit (RSU) communication unit 102, a policy execution unit 104, a reward determination unit 106, and a policy learning unit 108.

The configuration of FIG. 1 may be configured inside an autonomous vehicle, but is not necessarily limited thereto.

The information observation unit 100 collects observation information from the road-side unit (RSU) using the sensing module of the autonomous vehicle or the road-side unit communication unit 102.

The observation information may be information including at least a part of the state information about the surrounding environment, and if it is possible to collect all information about the surrounding environment, the observation information may be used with the same meaning as the state information.

The road-side unit communication unit 102 enables the autonomous vehicle to obtain information about the target vehicle through communication between the road-side unit and the OBU (On-Board Unit) when there is a vehicle that cannot be sensed through its own sensing module. At this time, information exchange between the autonomous vehicle and the road-side unit is performed through V2I (Vehicle to Infrastructure). In addition, the road-side unit may communicate with an adjacent road-side unit to obtain or transmit information about the target vehicle. Communication between road-side units is performed through 121 (Infrastructure to Infrastructure).

The policy execution unit 104 performs decision-making on actions including acceleration control and lane change of the autonomous vehicle based on observation information and policy.

The reward determination unit 106 determines the reward based on the observation information, actions, and next time point observation information according to the action.

The reward is determined through the reward term related to the jerk of the autonomous vehicle, the reward term for general driving, and the reward term related to the accident, which will be described in detail later.

The vehicle action determination according to this embodiment is performed based on deep reinforcement learning, and the learning of the policy based on deep reinforcement learning is performed through the design of a Markov Decision Process (MDP).

The Markov Decision Process is described in detail below.

In MDP, there is an assumption that an agent can fully observe all state information of the environment.

However, in a realistic environment such as autonomous driving, it is limited to completely observe all state information, so in this embodiment, the reinforcement learning problem is defined through a partially observable Markov decision process (POMDP) model that performs decision-making based on partial state information.

POMDP is defined as a tuple $\langle S, A, T, R, O, \Omega, \gamma \rangle$, where $s_t \in S$ is the state information of the road environment (state), $a_t \in A$ is the driving action of the autonomous driving agent (action), and $o_t \in O$ is the information that the autonomous driving agent can observe at state $s_t$ of the specific time point t (observation). $T(s_{t+1}|s_t,a_t)$ is the state transition probability, and $R(s_t,a_t,s_{t+1})$ is a reward function, $o_t \in O$ is the limited observation information that can be obtained from the state, $\Omega(o_t|s_t)$ is the observation probability, and $\gamma \in [0, 1)$ is the information that considers the future reward, which means the discount factor.

Figure 2:
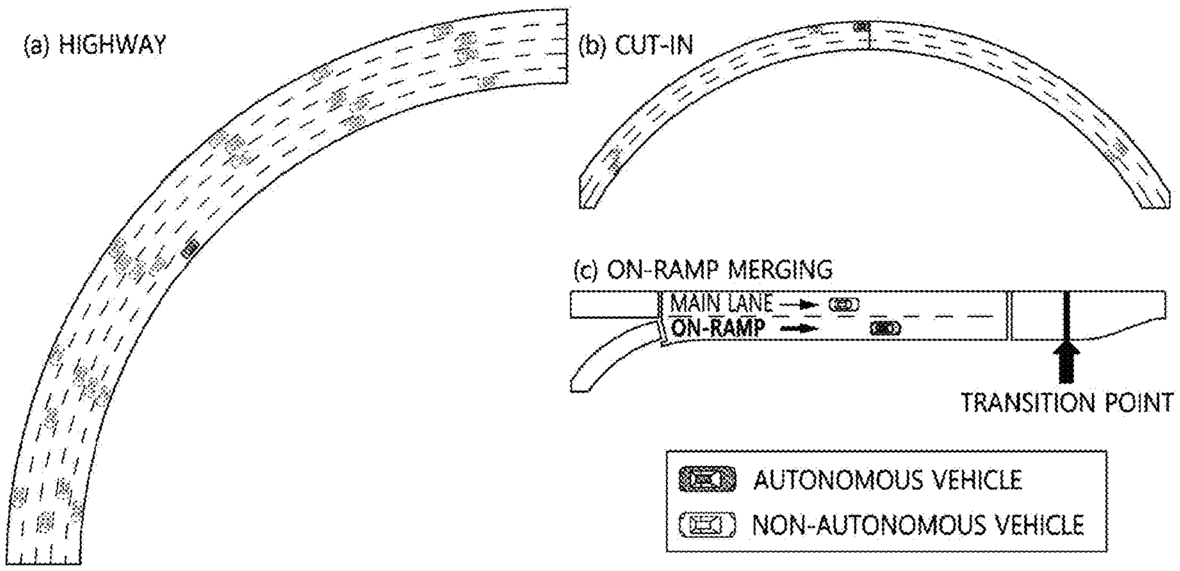
FIG. 2 is a diagram illustrating various road environments for policy learning according to this embodiment.

In this embodiment, for learning the jerk minimization policy, it is assumed that N−1 non-autonomous vehicles and 1 autonomous vehicle (agent) are mixed in various road environments as shown in FIG. 2.

Referring to FIG. 2, in the highway environment, the autonomous vehicle is required to drive stably among a number of non-autonomous vehicles with different driving characteristics. In this situation, the autonomous vehicle should minimize driving with rapid changes in acceleration/deceleration that cause a high jerk.

In a cut-in environment (a lane where a vehicle in an adjacent lane is directly in front of an autonomous vehicle), an autonomous vehicle should overtake non-autonomous vehicles driving at a speed lower than the autonomous vehicle's target speed to achieve the target speed. High jerk may occur during rapid changes in acceleration for overtaking and during driving to reach the target speed after overtaking.

In an on-ramp merging environment, an autonomous vehicle is required to merge from an on-ramp to a main lane. At this time, failure to determine the merging time point causes rapid deceleration for collision avoidance, resulting in high jerk.

Figure 3:
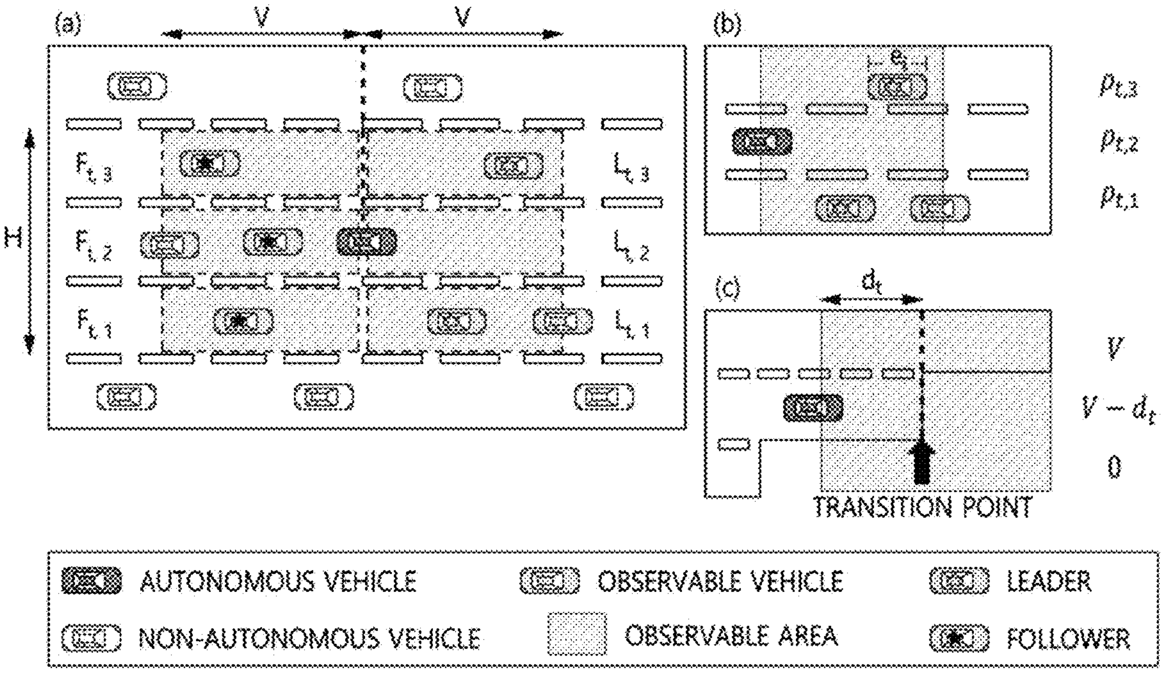
FIG. 3 is a diagram illustrating the observable area of an autonomous vehicle, the density of vehicles in each front lane, and the presence of lanes according to this embodiment.

FIG. 3 is a diagram showing the observable area of an autonomous vehicle (agent), vehicle density by front lane, and lane presence according to this embodiment.

In FIG. 3*a*, the area inside the dotted line indicates an observable area. A vehicle within the area is defined as an observable vehicle. Among the observable vehicles, the vehicle closest to the autonomous vehicle in each lane is defined as the leader vehicle, and the vehicle behind it is defined as the follower vehicle.

The collected observation information $o_t$ is defined as the observable distance 2V and the vehicle information within the observable lane H, which are as follows.

$$o_t = \left[v_{t,N}, \Delta v_t^T, \Delta p_t^T, \rho_t^T, \zeta_t^T\right]^T \qquad \text{[Equation 1]}$$

In the observation information, $v_{t,N}$ is the absolute speed of the autonomous vehicle, and $$\Delta v_t = \left[\Delta v_{t,l_1}, \Delta v_{t,l_2}, \cdots, \Delta v_{t,l_H}, \Delta v_{t,f_1}, \Delta v_{t,f_2}, \ldots, \Delta v_{t,f_H}\right]^T$$

is the relative speed between the autonomous vehicle and the observable leader/follower vehicles.

$\Delta p_t=[\Delta p_{t,l_1}, \Delta p_{t,l_2}, \ldots, \Delta p_{t,l_H}, \Delta p_{t,l_1}, \Delta p_{t,l_2}, \ldots \Delta_{t,f_H}]^T$ is the relative distance between the autonomous vehicle and the leader/follower vehicles, and $\rho_t=[\rho_{t,1}, \rho_{t,2}, \ldots, \rho_{t,H}]^T$ is the vehicle density by lane within the forward observable range.

In FIG. 3*b*, the vehicle density in a specific lane is calculated as the ratio of the vehicle in the lane to the forward observable range V.

$\zeta_t=[\zeta_{t,1}, \zeta_{t,2}, \ldots \zeta_{t,H}]^T$ is the presence or absence of a lane within the observable range, and is calculated by the observable range V and the remaining distance $d_t$ to the transition point, as in FIG. 3*c*.

If a lane exists within the forward observable range of the autonomous vehicle and then disconnects, it is defined as $V-d_t$, if the lane is already connected based on the autonomous vehicle, it is defined as V, and if the lane does not exist, it is defined as 0.

This embodiment is based on deep reinforcement learning, and the autonomous vehicle (agent) selects an action $a_t$ through the input of $s_t$ and obtains the corresponding reward $R(s_t,a_t,s_{t+1})$.

The reward determination unit 106 according to this embodiment determines the reward based on the observation information obtained through the sensing module or the road-side unit.

According to this embodiment, the reward function $R(s_t, a_t,s_{t+1})$ at a time point t comprises a reward term that considers jerk, a reward term for general driving, and a reward term for accident prevention (collision prevention), as shown in the equation below, and through this, the autonomous vehicle learns a driving policy that promotes smooth driving by minimizing jerk, and safe driving by avoiding collisions.

$$R(s_t, a_t, s_{t+1}) = R_{t,jerk} + R_{t,driving} + R_{t,collison} \quad \text{[Equation 2]}$$

$R_{t,jerk}$ is a term that imposes a penalty to the jerk due to rapid changes in acceleration/deceleration of an autonomous vehicle (hereinafter referred to as jerk reward term), and is defined as follows:

$$R_{t,jerk} = -\eta_{jerk}\left|\frac{a_{t,acc} - a_{t',acc}}{\Delta t}\right| \quad \text{[Equation 3]}$$

Here, $\eta_{jerk}$ is the coefficient for the jerk reward term, $a_{t,acc}$ is the acceleration at time point $a_{t',acc}$ is the acceleration at time point t', and $\Delta t=t-t'$ is the interval of one time step.

Since the difference in acceleration is directly related to the jerk, the jerk reward term can help the autonomous vehicle mitigate driving with rapid acceleration and deceleration changes that cause large jerks.

$R_{t,driving}$ is a term for successful driving in general driving situations, and is configured by a linear combination of terms related to speed, lane change, safe distance, and delayed merge in a road merging environment.

$$R_{t,driving} = \sum_{i=1}^{5}\eta_i R_{t,i} \quad \text{[Equation 4]}$$

$[\eta_i]_{i\in\{1, \ldots 5\}}$ represents the coefficient for each term $R_{t,i}$.

The first term $R_{t,1}$ is a term for the autonomous vehicle to learn an action that drives close to the target speed v* while not exceeding the speed limit $v_{limit}$, and is defined as follows.

$$R_{t,1} = \begin{cases} \frac{v_{t+1,N}}{v^*}, & v_{t+1,N} \le v^* \\ \frac{v_{limit} - v_{t+1,N}}{v_{limit} - v^*}, & v_{t+1,N} > v^* \end{cases} \quad \text{[Equation 5]}$$

The second term $R_{t,2}$ is a penalty term for lane changes, which is activated when an autonomous vehicle performs a lane change ($|a_{t,lc}|=1$), as shown below.

$$R_{t,2} = \begin{cases} -1, & |a_{t,lc}| = 1 \\ 0, & |a_{t,lc}| = 0 \end{cases} \quad \text{[Equation 6]}$$

$R_{t,2}$ prevents an autonomous vehicle from making frequent lane changes without meaning by imposing a certain penalty on all lane change actions of the autonomous vehicle.

The autonomous vehicle maintains a safe distance between vehicles through the third term $R_{t,3}$ and the fourth term $R_{t,4}$ to learn safe driving actions.

Figure 4:
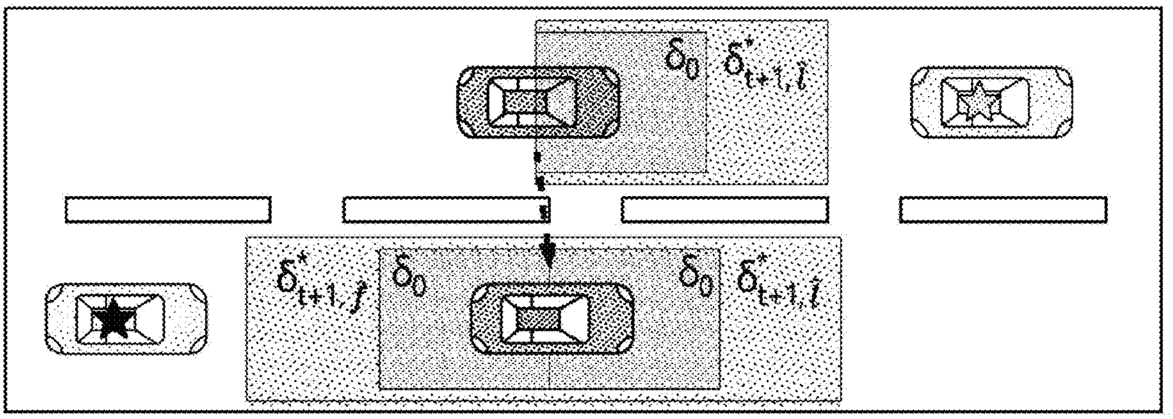
FIG. 4 is a diagram illustrating the safety distance between the autonomous vehicle and the leader/follower vehicle.

FIG. 4 is a diagram showing the safe distance between the autonomous vehicle and the leader/follower vehicle.

$R_{t,3}$ is a penalty when the safe distance $$\delta^*_{t+1,\hat{l}}$$

from the leader vehicle in the same lane is violated, and the safe distance $$\delta^*_{t+1,\ddot{l}}$$

and minimum safe distance $\delta_0$ from the leader vehicle are calculated by the Intelligent Driver Model (IDM) based on the control theory.

$$R_{t,3} = \min\left[0, 1 - \left(\frac{\delta^*_{t+1,\hat{l}}}{\Delta p_{t+1,\hat{l}}}\right)^2\right] \quad \text{[Equation 7]}$$

In addition, the safe distance $$\delta^*_{t+1,\hat{f}}$$

from the follower vehicle is also calculated by the IDM, and $R_{t,4}$ is a penalty when the lane change action $|a_{t,l_c}|=1$ of the autonomous vehicle violates the safe distance from the follower in the same lane.

$$R_{t,4} = |a_{t,lc}| \min\left[0, 1 - \left(\frac{\delta^*_{t+1,\hat{f}}}{\Delta P_{t+1,\hat{f}}}\right)^2\right] \quad \text{[Equation 8]}$$

The fifth term $R_{t,5}$ is a penalty term for the delayed merge of the autonomous vehicle in a road merging environment. The closer the autonomous vehicle merges to the lane transition point, the more delayed the merge is considered and the more penalty is given.

$$R_{t,5} = \begin{cases} \zeta_{t+1,\hat{h}} - V, & \zeta_{t+1,\hat{h}} < V \\ 0, & \zeta_{t+1,\hat{h}} \geq V \end{cases} \quad \text{[Equation 9]}$$

Here, $\zeta_{t+\hat{h}}$ represents the remaining driving distance from the lane where the autonomous vehicle is located to the lane transition point.

If the autonomous vehicle continues to drive without changing lanes on the ramp lane, the penalty increases linearly inversely to the remaining road length. Therefore, the autonomous vehicle learns to change lanes to the main road and drive.

The last term $R_{t,collision}$ imposes a penalty on the autonomous vehicle when an accident occurs, and is not activated if an accident does not occur.

$$R_{t,collision} = \begin{cases} -\eta_{collision}, & \text{Accident} \\ 0, & \text{Otherwise} \end{cases} \quad \text{\{Equation 10]}$$

The policy learning for decision-making of the policy execution unit 104 according to this embodiment is performed in the policy learning unit 108, and the autonomous vehicle learns the policy by storing experience information. Here, the experience information may comprise current observation information, actions, next time point observation information, and reward.

The policy learning unit 108 updates the policy for decision-making of each autonomous vehicle using the experience information of multiple autonomous vehicles based on deep reinforcement learning.

This is not limited to a specific reinforcement learning algorithm, and can be comprehensively applied to most algorithms based on deep reinforcement learning methodology. The learning of the policy may be repeated for a predefined number of learning times.

Figure 5:
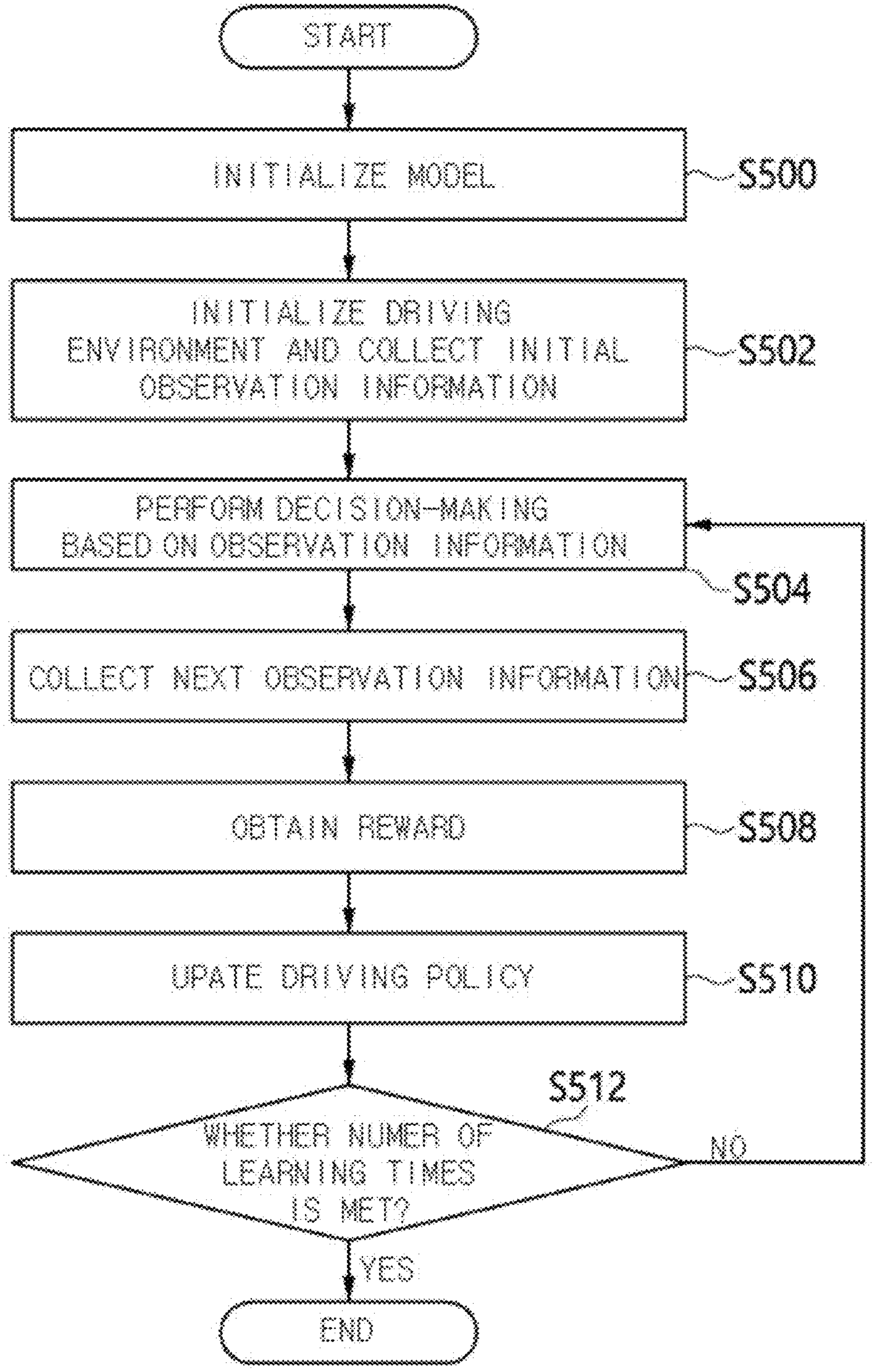
FIG. 5 is a diagram illustrating the policy learning process in an autonomous vehicle environment according to this embodiment.

FIG. 5 is a diagram illustrating a policy learning process in an autonomous vehicle environment according to the present embodiment.

Referring to FIG. 5, the apparatus according to the present embodiment initializes a model (step 500), initializes a driving environment, and collects initial observation information (step 502).

Here, the observation information may be information collected from a sensing module of the autonomous vehicle or a road-side unit.

Thereafter, an action is determined based on the collected observation information (step 504).

The action determination according to the present embodiment comprises a decision-making to minimize jerk to improve ride comfort.

The observation information at the next time point is changed by the action determined in step 504, and the next observation information is collected accordingly (step 506).

The reward is determined based on the observation information in steps 504 and 506, the action according to the observation information, and the next observation information (step 508), and the driving policy for decision-making is updated based on the experience information including the determined reward (step 510).

The apparatus according to the present embodiment determines whether the number of learning times is met (step 512) and ends learning.

Table 1 shows the simulation results for the decision-making process according to the present embodiment and the conventional decision-making process.

TABLE 1

| Scenario | w/ $\mathcal{R}_{t,\,jerk}$ | w/o $\mathcal{R}_{t,\,jerk}$ |
|---|---|---|
| Highway | 8.816 ± 0.178 | 14.175 ± 1.624 |
| Cut-in | 9.014 ± 0.224 | 10.973 ± 0.255 |
| On-ramp merging | 10.354 ± 0.413 | 11.567 ± 0.493 |

In Table 1, it was confirmed that the model considering the jerk (w/$R_{t,jerk}$) decreases the jerk value by an average of 37.81% in the Highway environment, an average of 17.85% in the Cut-in environment, and an average of 10.49% in the On-ramp merging environment compared to the model not considering the jerk (w/o $R_{t,jerk}$).

The above process explains reinforcement learning in an online environment, and this embodiment is not limited thereto. The policy can be learned using a pre-collected dataset through offline reinforcement learning, and the policy can be improved through fine-tuning that additionally performs learning in an online environment.

Hereinafter, offline and online fine-tuning reinforcement learning methods are described in detail.

Figure 6:
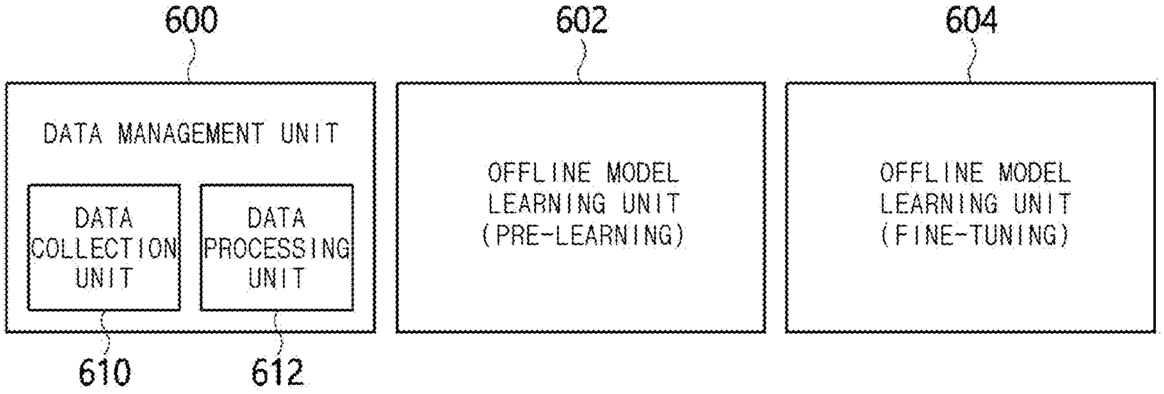
FIG. 6 is a diagram illustrating the configuration of a deep reinforcement learning-based jerk minimization behavior determination apparatus according to another embodiment of the present invention.

FIG. 6 is a diagram illustrating the configuration of a deep reinforcement learning-based jerk minimization behavior determination apparatus according to another embodiment of the present invention.

As illustrated in FIG. 6, the apparatus according to this embodiment may comprise a data management unit 600, an offline model learning unit 602, and an online model learning unit 604.

The data management unit 600 collects data for offline learning in advance and processes the collected data.

The data management unit 600 comprises a data collection unit 610 and a data processing unit 612.

The data collection unit 610 collects data on the domain of the problem to be solved in advance. The form of the collected data does not matter, and the prior data is processed by the data processing unit 612 and then used for neural network model learning.

The data processing unit 612 processes the prior data so that it can conform to the Markov decision process model of the problem to be solved.

In addition, the data processing unit 612 performs correction of incorrect data, data normalization, removal of abnormal data, etc., and for example, in the case of an image-based dataset, adjustment of pixel values, etc.

The data management unit 600 according to the present embodiment collects observation information and action on the environment through observation equipment, matches the observation information, action, and next observation information, and calculates a reward based on the matched observation, action, and next observation information. Through this process, the data management unit 600 stores the pre-data set including the current observation information, actions, next observation information, and reward in the offline buffer.

The offline model learning unit 602 learns the neural network model using the pre-data set.

At this time, the neural network model may comprise an actor-critic-based policy network and a state-action value function network.

The critic network with the loss function below predicts the state-action value function value for a given state and action pair. Here, the goal is to accurately evaluate the expected value of the total reward that can be obtained from the next time point state.

$$L_{critic}(\theta) = \mathbb{E}_{(o,a,o',r)\sim D}\left[Q_\theta(o, a) - \left(r + \gamma Q_{\theta'}\left(o', \pi_{\phi'}(o')\right)\right)^2\right] \quad \text{[Equation 11]}$$

Here, $Q_\Theta$: Q network, $Q_{\Theta'}$: target Q network, $\pi_{\phi'}$: target policy network, D: experience replay buffer.

The offline model learning unit 602 trains the neural network model in the direction of reducing the difference by comparing the summation of the current reward and the expected reward in the next state with the value for the current state-action pair.

The actor network with the loss function below learns in the direction of maximizing the Q value of the critic network, and can be utilized as a term that utilizes pre-collected data.

$$L_{actor}(\phi) = \mathbb{E}_{(o,a,)\sim D}\left[(1-\alpha)Q_\theta\left(o, \pi_\phi(o)\right) - \alpha(\alpha - \pi_\phi(o))^2\right] \quad \text{[Equation 12]}$$

Here, a: action extracted from the dataset a: weight.

The policy network is a network that outputs actions according to a given state, and the state-action value function network is defined as a network that evaluates the value of a specific state-action pair.

As described above, after learning the policy in an offline environment using a pre-collected data set, the autonomous driving policy is fine-tuned to suit the characteristics of each driver.

Figure 7:
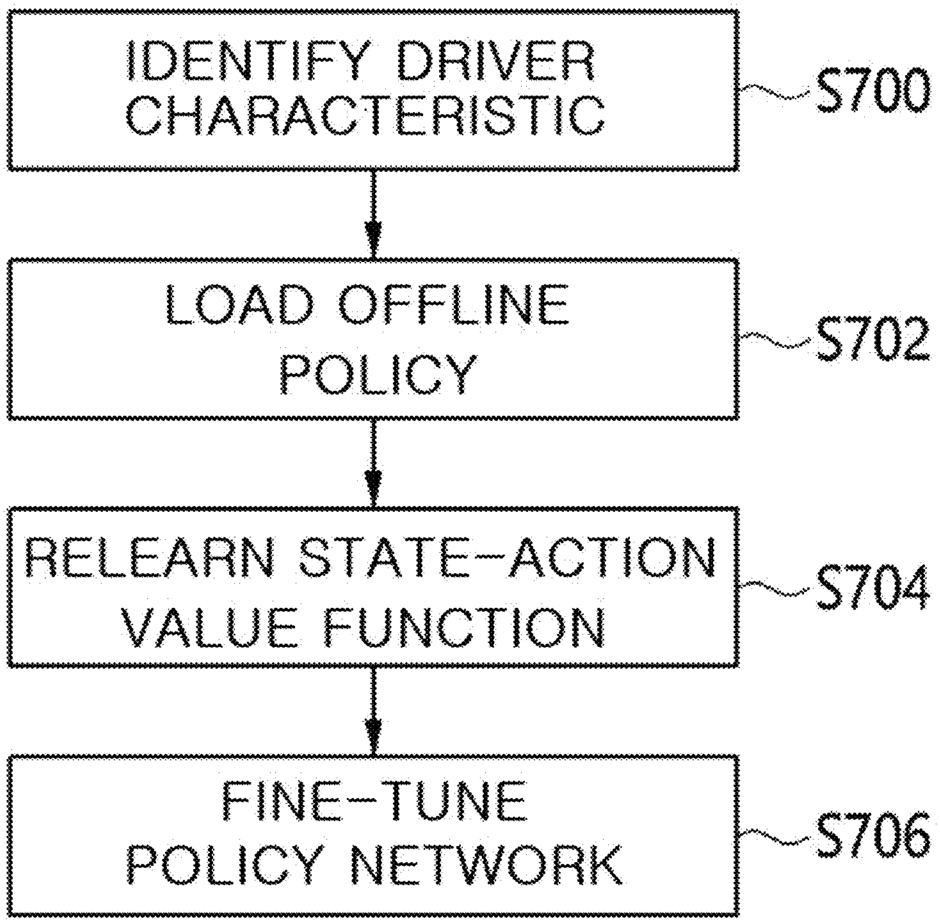
FIG. 7 is a flowchart illustrating an online fine-tuning process according to this embodiment.

FIG. 7 is a flowchart illustrating the online fine-tuning process according to this embodiment.

Referring to FIG. 7, another apparatus in this embodiment identifies driver characteristics (step 700).

In step 700, driver characteristics can be identified by the driver directly inputting them through a vehicle interface or by inference based on driver driving data.

The vehicle interface may be a touchscreen or a voice recognition module, and the driver characteristics input by the user may comprise smooth driving, agile driving, etc.

As described above, $R_{t,jerk}$ is a jerk reward term that imposes a penalty to the jerk due to rapid changes in acceleration/deceleration of an autonomous vehicle, $\eta_{jerk}$ is a coefficient for the jerk reward term, and is a coefficient set to reflect the driver's driving characteristic for comfort ride, and reinforcement learning determines the importance of the corresponding term through the coefficient of the reward term.

According to this embodiment, $\eta_{jerk}$ may be set through user input, and $\eta_{jerk}$ may also be estimated through inference.

Inference of driver characteristic may be performed through inverse reinforcement learning (IRL), and IRL is a method of obtaining a reward function that explains the action of an autonomous vehicle through its action history.

According to this embodiment, the coefficient of the reward function $R_{t,jerk}$ can be estimated based on data on the driver's driving characteristic.

A pre-learned offline policy is loaded (step 702).

Step 702 loads an offline policy pre-learned by the offline model learning unit 602.

Then, the state-action value function network is initialized and re-learning is performed according to the set pre-reward function (step 704).

Finally, the bias of the policy network is initialized and then fine-tuning is performed (step 706).

Figure 8:
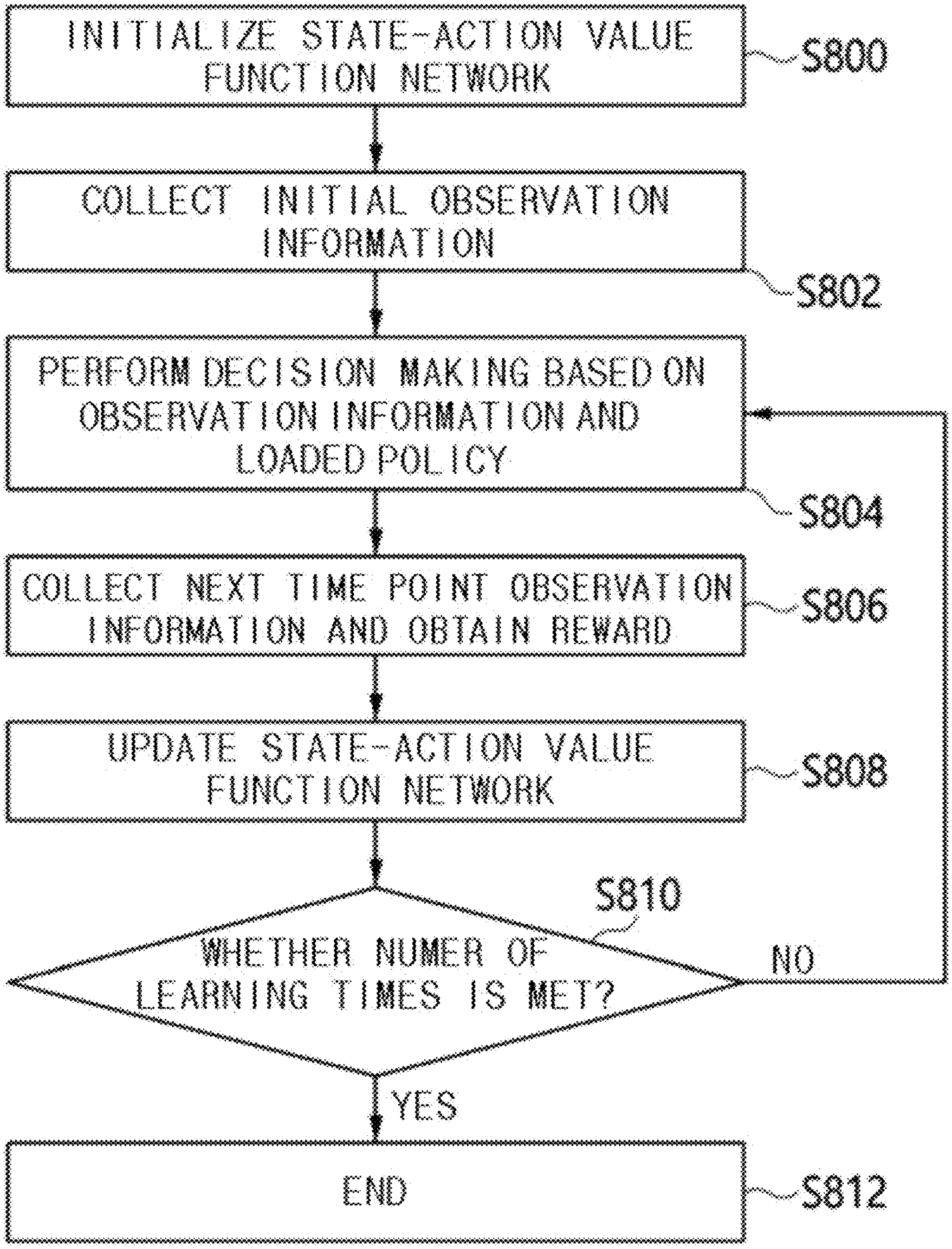
FIG. 8 is a diagram illustrating a flowchart of a state-action value function re-learning process according to this embodiment.

FIG. 8 is a diagram illustrating a flowchart of the state-action value function re-learning process according to the present embodiment.

Referring to FIG. 8, the online model learning unit 604 initializes the state-action value function network (step 800) and collects initial observation information (step 802).

The online model learning unit (604) is required to initialize and re-learn the state-action value function network parameters. The state-action value function network re-learning process is for re-learning a new state-action value function network that matches the policy network to be fine-tuned by reflecting the user's characteristic.

Then, an action is determined based on the policy network of the pre-learned neural network model and the initial observation information (step 804).

The online model learning unit 604 collects next time point observation information according to the action and obtains a reward using the observation information, action, and next time point observation information (step 806).

Next, the parameters of the state-action value function network are updated according to the obtained reward (step 808), and whether the preset number of learning times has been met is determined (step 810), and if the number of learning times has been met, the re-learning of the state-action value function is terminated (step 812).

Figure 9:
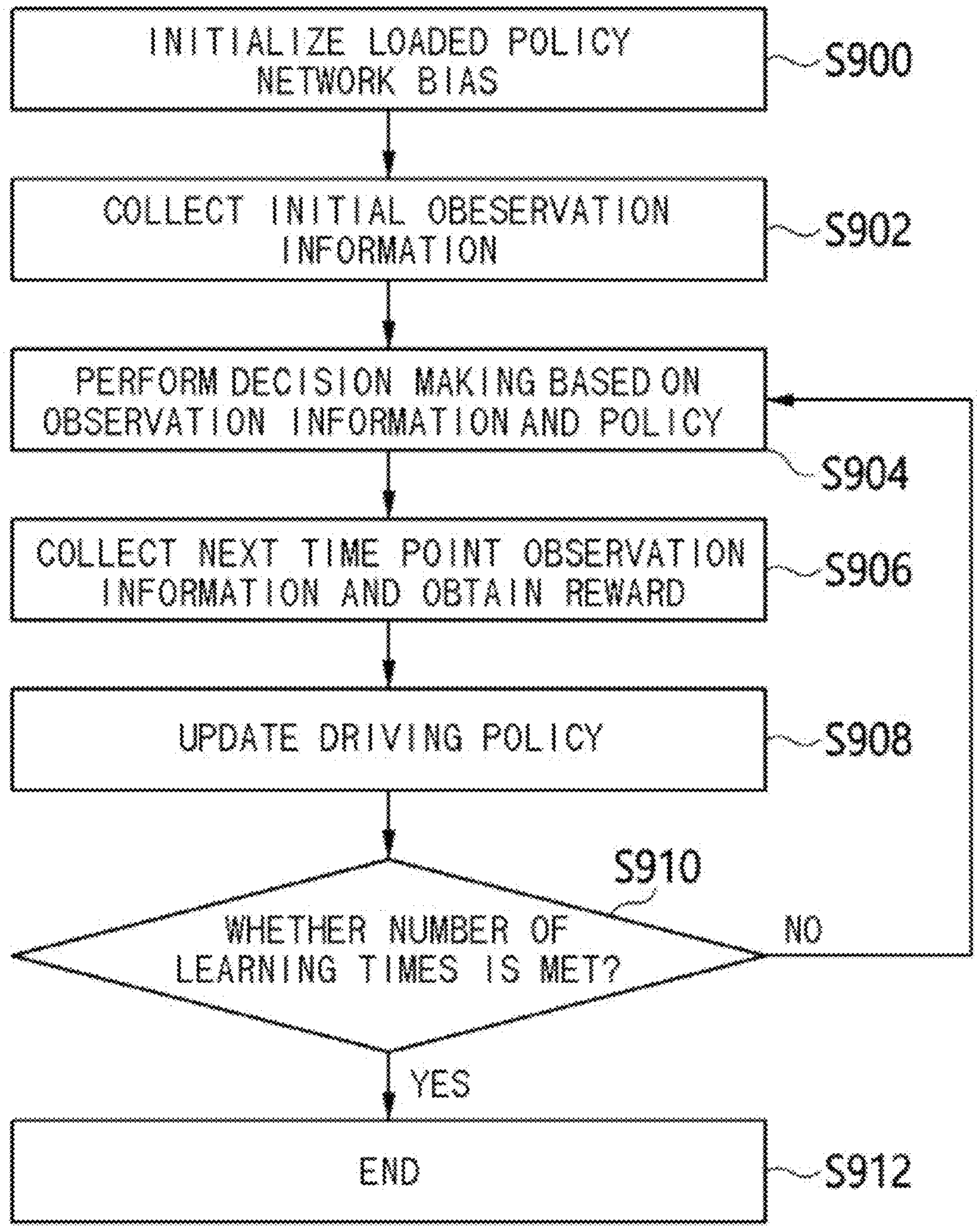
FIG. 9 is a diagram illustrating a flowchart of a policy network fine-tuning process according to this embodiment.

FIG. 9 is a flowchart illustrating a policy network fine-tuning process according to the present embodiment.

Referring to FIG. 9, the online model learning unit 604 initializes the loaded policy network bias (step 900) and collects initial observation information (step 902) for fine-tuning the policy network.

Then, the action is determined based on the initial observation information (step 904).

The online model learning unit 604 requires policy network parameter initialization, and in the case of policy network parameter initialization, there is a method for partially initializing.

The online model learning unit 604 collects next time point observation information according to the action and obtains a reward using the observation information, action, and next time point observation information (step 906).

Next, the pre-learned driving policy is updated according to the obtained reward (step 908), and whether the preset number of learning times has been met is determined (step 910), and if the number of learning times has been met, the fine-tuning is terminated (step 912).

The above-described method for determining an action for minimizing jerk for improving the ride comfort of an autonomous vehicle based on deep reinforcement learning can also be implemented in the form of a recording medium including computer-executable instructions, such as an application or program module executed by a computer. The computer-readable medium may be any available medium that can be accessed by a computer, and includes both volatile and nonvolatile media, removable and non-removable media. In addition, the computer-readable medium may include a computer storage medium. The computer storage medium includes both volatile and nonvolatile, removable and non-removable media implemented by any method or technology for storing information, such as computer-readable instructions, data structures, program modules, or other data.

The above-described embodiments of the present invention have been disclosed for the purpose of illustration, and those skilled in the art with common knowledge of the present invention will be able to make various modifications, changes, and additions within the spirit and scope of the present invention, and such modifications, changes, and additions should be considered to fall within the scope of the following patent claims.

The invention claimed is:

1. A vehicle behavior determination apparatus based on deep reinforcement learning for minimizing jerk comprising:

an information observation unit that collects observation information from a sensing module or a road-side unit (RSU) of an autonomous vehicle;

a policy execution unit that performs decision-making on an action including acceleration control and lane change of the autonomous vehicle based on the observation information and policy;

a reward determination unit that determines a reward based on the observation information, the action, and the next time point observation information according to the action; and a policy learning unit that updates the policy based on the collected observation information, the action, the next time point observation information, and the reward, and learns the policy by determining whether the number of learning times is met, wherein the reward in the reward determination unit is determined through a jerk reward term, a reward term for general driving of the autonomous vehicle, and a reward term for an accident, wherein the reward term for general driving is configured by a linear combination of terms related to speed, lane change, safety distance, and delayed merge in a road merging environment, wherein the road merge-related term is defined as a penalty term for delayed merge of an autonomous vehicle, and the closer the autonomous vehicle merges to the lane transition point, the more it is considered to be a delayed merge and a penalty is imposed.

2. The apparatus of claim 1, wherein the observation information comprises at least one of the absolute speeds of the autonomous vehicle, the relative speed between the closest leader vehicle in front and the closest follower vehicle in the rear among vehicles in each lane observable by the autonomous vehicle, the relative distance between the leader vehicle and the follower vehicle, density of vehicles by lane within a forward observation range of the autonomous vehicle, and presence or absence of a lane within the forward observation range of the autonomous vehicle.

3. The apparatus of claim 1, wherein the jerk reward term is defined as a term that imposes a penalty for jerk due to rapid changes in acceleration/deceleration of the autonomous vehicle.

4. The apparatus of claim 3, wherein the jerk reward term $R_{t,jerk}$ is defined by the following Equation, $$R_{t,jerk} = -\eta_{jerk}\left|\frac{a_{t,acc} - a_{t',acc}}{\Delta t}\right| \quad \text{[Equation]}$$

Here, $\eta_{jerk}$ is a coefficient for the jerk reward term, $a_{t,acc}$ is acceleration at time t, $a_{t',acc}$ is acceleration at time t', and $\Delta t = t - t'$ is a time step interval.

5. The apparatus of claim 4, wherein the coefficient is a coefficient set to reflect a driver's riding comfort driving characteristic and is determined based on user input through a user interface or data on a driver's driving characteristic.

6. The apparatus of claim 1, wherein the speed-related term is defined as a term for learning an action in which an autonomous vehicle drives close to a target speed while not exceeding a speed limit.

7. The apparatus of claim 1, wherein the road merge-related term is defined by the following Equation $$R_{t,5} = \begin{cases} \zeta_{t+1,\hat{h}} - V, & \zeta_{t+1,\hat{h}} < V \\ 0, & \zeta_{t+1,\hat{h}} \geq V \end{cases} \quad \text{[Equation]}$$

Here, $\zeta_{t+1,\hat{h}}$ is the remaining driving distance from a lane where an autonomous vehicle is located to a lane transition point.

8. The apparatus of claim 1 further comprises, a data management unit that collects and processes data for offline reinforcement learning in advance; and an offline model learning unit that learns an offline policy network and an offline state-action value function network using a pre-collected dataset including observation information, an action, next time point observation information, a reward, and a cumulative reward collected by the data management unit, wherein the reward of the pre-collected dataset comprises a jerk reward term, a reward term for general driving of the autonomous vehicle, and a reward term related to an accident, wherein the policy learning unit performs fine-tuning to update parameters of the offline policy network using an online dataset including the observation information, an action, next time point observation information, and a reward obtained through interaction with the offline policy network and environment, and the pre-collected dataset.

9. The apparatus of claim 8, wherein the policy learning unit, loads the offline policy network, performs re-learning according to a preset reward function after initializing the state-action value function network, performs fine-tuning after initializing the bias of the policy network.

10. The apparatus of claim 8, wherein the policy learning unit, obtains the observation information, an action, next time point observation information, and reward obtained through interaction with the environment, updates, according to the obtained reward, parameters of a pre-learned policy network and a re-initialized constructed state-action value function network according to the re-learning.

11. A method for determining a vehicle behavior that minimizes jerk based on deep reinforcement learning in an apparatus including a processor and memory comprising:

collecting observation information from a sensing module of an autonomous vehicle or a road-side unit (RSU);

performing decision-making on an action including acceleration control and lane change of the autonomous vehicle based on the observation information and policy;

determining a reward based on the observation information, the action, and the next time point observation information according to the action; and updating the policy based on the collected observation information, the action, the next time point observation information, and the reward, and learning the policy by determining whether the number of learning times is met, wherein the reward is determined through a jerk reward term, a reward term for general driving of the autonomous vehicle, and a reward term for an accident, wherein learning the policy comprises, collecting and processing data for offline reinforcement learning in advance; and learning an offline policy network and an offline state-action value function network using a pre-collected dataset including observation information, an action, next time point observation information, a reward, and a cumulative reward, wherein the reward of the pre-collected dataset comprises a jerk reward term, a reward term for general driving of the autonomous vehicle, and a reward term related to an accident, wherein learning the offline policy network and the offline state-action value function network comprises, performing fine-tuning to update parameters of the offline policy network using an online dataset including the observation information, an action, next time observation information, and a reward obtained through interaction with the offline policy network and environment and the pre-collected dataset, wherein learning the policy comprises, loading the offline policy network;

performing re-learning according to a preset reward function after initializing the state-action value function network; and performing fine-tuning after initializing the bias of the policy network.

12. The method of claim 11, wherein the jerk reward term is defined as a term that imposes a penalty for jerk due to rapid changes in acceleration/deceleration of the autonomous vehicle.

13. The method of claim 12, wherein the jerk reward term $R_{t,jerk}$ is defined by the following Equation, $$R_{t,jerk} = -\eta_{jerk}\left|\frac{a_{t,acc} - a_{t',acc}}{\Delta t}\right| \quad \text{[Equation]}$$

Here, $\eta_{jerk}$ is a coefficient for the jerk reward term, and $\Delta t=t-t'$ is a time step interval.

14. The method of claim 13, wherein the coefficient is a coefficient set to reflect a driver's riding comfort driving characteristic and is determined based on user input through a user interface or data on a driver's driving characteristic.

15. The method of claim 11, wherein learning the policy comprises, obtaining the observation information obtained through interaction with the environment, an action, next time point observation information, and a reward, updating, according to the obtained reward, parameters of a pre-learned policy network and parameters of a re-initialized constructed state-action value function network according to the re-learning.

16. A vehicle behavior determination apparatus based on deep reinforcement learning for minimizing jerk comprising:

a processor; and a memory connected to the processor, wherein the memory comprises program instructions, executed by the processor, to perform operations performing, collecting observation information from a sensing module or a road-side unit (RSU) of an autonomous vehicle, performing decision-making on an action including acceleration control and lane change of the autonomous vehicle based on the observation information and policy, determining a reward based on the observation information, the action, and the next time point observation information according to the action, and updating the policy based on the collected observation information, the action, the next time point observation information, and the reward, and learning the policy by determining whether the number of learning times is met, wherein the reward is determined through a jerk reward term, a reward term for general driving of the autonomous vehicle, and a reward term for an accident, wherein learning the policy comprises, collecting and processing data for offline reinforcement learning in advance; and learning an offline policy network and an offline state-action value function network using a pre-collected dataset including observation information, an action, next time point observation information, a reward, and a cumulative reward, wherein the reward of the pre-collected dataset comprises a jerk reward term, a reward term for general driving of the autonomous vehicle, and a reward term related to an accident, wherein learning the offline policy network and the offline state-action value function network comprises, performing fine-tuning to update parameters of the offline policy network using an online dataset including the observation information, an action, next time observation information, and a reward obtained through interaction with the offline policy network and environment, and the pre-collected dataset, wherein learning the policy comprises, loading the offline policy network;

performing re-learning according to a preset reward function after initializing the state-action value function network; and performing fine-tuning after initializing the bias of the policy network.

* * * * *